United States Patent [19]

Sato et al.

[11] Patent Number: 5,162,464
[45] Date of Patent: Nov. 10, 1992

[54] PROCESS FOR PRODUCING A POLYOLEFIN

[75] Inventors: Morihiko Sato, Yokkaichi; Mitsuhiro Mori, Aichi; Yozo Kondo, Yokkaichi, all of Japan

[73] Assignee: Tosoh Corporation, Shinnanyo, Japan

[21] Appl. No.: 727,354

[22] Filed: Jul. 8, 1991

Related U.S. Application Data

[63] Continuation of Ser. No. 451,636, Dec. 18, 1989, abandoned.

[30] Foreign Application Priority Data

Dec. 27, 1988 [JP] Japan .............................. 63-327647

[51] Int. Cl.$^5$ ...................... C08F 4/651; C08F 4/654; C08F 10/00
[52] U.S. Cl. ..................................... 526/124; 502/125; 526/132; 526/133; 526/352; 526/909
[58] Field of Search ...................... 526/124, 132, 133

[56] References Cited

U.S. PATENT DOCUMENTS

| | | | |
|---|---|---|---|
| 3,901,863 | 8/1975 | Berger et al. | 526/132 |
| 4,209,601 | 6/1980 | Kuroda et al. | 526/132 |
| 4,339,351 | 7/1982 | Mashita et al. | 526/132 |
| 4,804,726 | 2/1989 | Kondo et al. | 526/124 |

FOREIGN PATENT DOCUMENTS

| | | |
|---|---|---|
| 230707 | 8/1987 | European Pat. Off. . |
| 56-26940 | 3/1981 | Japan . |
| 57-2304 | 1/1982 | Japan . |
| 1464451 | 2/1977 | United Kingdom . |
| 2016486 | 9/1979 | United Kingdom . |

*Primary Examiner*—Edward J. Smith
*Attorney, Agent, or Firm*—Oblon, Spivak, McClelland, Maier & Neustadt

[57] ABSTRACT

A process for producing a polyolefin, which comprises polymerizing at least one olefin in the presence of a catalyst system comprising (A) a solid catalyst component (A) obtained by reacting to a uniform solution containing (i) at least one member selected from the group consisting of metallic magnesium and an organic hydroxide compound, and an oxygen-containing organic magnesium compound, and (ii) at least one oxygen containing organic titanium compound, (iii) at least one organic aluminum compound, (iv) at least one boron compound having an alkoxy group, and (v) at least one aluminum halide compound; and (B) at least one catalyst component (B) selected from the group consisting of organic metal compounds of metals of Groups Ia, IIa, IIb, IIIb and IVb of the Periodic Table.

7 Claims, No Drawings

PROCESS FOR PRODUCING A POLYOLEFIN

This application is a continuation of application Ser. No. 07/451,636, filed on Dec. 18, 1989, now abandoned.

The present invention relates to a process for producing a polyolefin, which comprises polymerizing at least one olefin in the presence of a novel catalyst system.

It is already known to use a catalyst system comprising a transition metal compound and an organic metal compound for polymerization of olefins under low pressure. Further, as a catalyst of high activity type, a catalyst system is also known which contains a reaction product of an inorganic or organic magnesium compound with a transition metal compound, as one component.

Japanese Examined Patent Publications No. 15110/1977 and No. 27677/1977 disclose a polymerization method capable of producing a polyolefin having extremely high impact resistance. In this method, a catalyst system having very high activities is used which comprises a catalyst component (A) obtained by reacting magnesium metal and an organic hydroxide compound or an oxygen-containing organic organic compound of magnesium, an oxygen-containing organic transition metal compound and an aluminum halide, and a catalyst component (B) which is an organic metal compound.

However, the polymer particles obtained in the presence of such a catalyst, are still not fully satisfactory from the viewpoint of the powder properties in that the average particle size is small, the particle size distribution is wide, or the proportion of very fine particles contained in the polymer particles is high.

Namely, if the polymer particles have such a particle size distribution, there will be various troubles during the preparation of the polyolefin, for example, during polymerization, separation of the particles from the polymer slurry, drying the powder and transporting the powder, and in some cases, it becomes impossible to conduct continuous production for a long period of time. In a case where a polymer is prepared by a multi-stage polymerization, if the particle size distribution of the polymer particles is wide, classification of the powder is likely to take place during the transportation or at the time of incorporating additives after drying, and the physical properties tend to be different from one another depending upon the particle sizes, whereby the adverse effects to the quality can not be neglected.

Further, the present inventors have previously found it possible to increase the particle size of a polymer by using a silicon compound in addition to the material for the catalyst component (A) as disclosed in e.g. Japanese Examined Patent Publication No. 15110/1977 and have applied for a patent (Japanese Examined Patent Publication No. 58367/1987). However, this method still does not improve the particle size distribution.

The present inventors have found it possible to improve the particle size distribution by partially reducing with an organic aluminum compound a uniform solution containing the materials for the catalyst component (A), i.e. magnesium and titanium, as disclosed in e.g. Japanese Examined Patent Publication No. 15110/1977 (hereinafter referred to as a Mg-Ti solution), and then reacting it with a silicon compound and further with an aluminum halide compound, and have applied for a patent (U.S. Pat. No. 4,804,726). However, the particle size can not thereby be sufficiently increased. This tendency is remarkable particularly when the molecular weight distribution is wide.

It is an object of the present invention to substantially improve the powder properties of polymer particles without impairing the feature of the process of the above-mentioned Japanese Examined Patent Publication No. 15110/1977 that a polymer having a narrow molecular weight distribution can be produced under high catalytic activities.

Under these circumstances, the present inventor have conducted extensive studies and, as a result, have found it possible to obtain a polymer having a large particle size and excellent powder properties by reacting an aluminum halide compound to the reaction product obtained by reacting a boron compound and an organic aluminium compound to the starting material for the catalyst component (A) disclosed in e.g. Japanese Examined Patent Publication No. 15110/1977, i.e. to a Mg-Ti solution. The present invention has been accomplished on the basis of this discovery.

The present invention provides a process for producing a polyolefin, which comprises polymerizing at least one olefin in the presence of a catalyst system comprising:

(A) a solid catalyst component (A) obtained by reacting to a uniform solution containing (i) at least one member selected from the group consisting of metallic magnesium and an organic hydroxide compound, and an oxygen-containing organic magnesium compound, and (ii) at least one oxygen-containing organic titanium compound, (iii) at least one organic aluminum compound, (iv) at least one boron compound having an alkoxy group, and (v) at least one aluminum halide compound; and (B) at least one catalyst component (B) selected from the group consisting of organic metal compounds of metals of Groups Ia, IIa, IIb, IIIb and IVb of the Periodic Table.

Now, the present invention will be described in detail.

The reason for the excellent properties of the solid catalyst component (A) prepared and used in the present invention, is not clearly understood. However, it is considered that the reaction product obtained by reacting the organic aluminum compound (iii) and the boron compound (iv) to the Mg-Ti solution, serves as nuclei for forming particles during the subsequent reaction with the aluminum halide compound (v) conducted for the purpose of completing the formation of catalyst particles, whereby a solid catalyst component (A) having an excellent particle shape can be obtained.

It is surprising that in the present invention, remarkable effects are obtainable by reacting the boron compound (iv) and the organic aluminum compound (iii) to the Mg-Ti solution, followed by the reaction with the aluminum halide compound (v). Particularly by the use of a boron compound, excellent powder properties with a large particle size can be obtained.

In the present invention, the following materials can be used as the metallic magnesium and the organic hydroxide compound, and the oxygen-containing magnesium compound, as the reactant (i) to be used for the preparation of the solid catalyst component (A).

Firstly, in a case where metallic magnesium and the organic hydroxide compound are used, the metallic magnesium may be in any form i.e. in the form of a powder, particles, a foil or a ribbon, and as the organic hydroxide compound, alcohols, organic silanols and phenols are suitable.

As the alcohols, straight chain or branched chain aliphatic alcohols, alicyclic alcohols or aromatic alcohols having from 1 to 18 carbon atoms may be used. For example, methanol, ethanol, n-propanol, i-proponol, n-butanol, i-butanol, n-hexanol, 2-ethylhexanol, n-octanol, i-octanol, n-stearyl alcohol, cyclopentanol, cyclohexanol and ethylene glycol may be mentioned.

The organic silanols have at least one hydroxyl group and an organic group which is selected from the group consisting of alkyl, cycloalkyl, arylalkyl, allyl, alkylaryl and aromatic groups having from 1 to 12 carbon atoms, preferably from 1 to 6 carbon atoms. Specifically, trimethylsilanol, triethylsilanol, triphenylsilanol and t-butyldimethylsilanol may, for example, be mentioned.

As the phenols, phenol, cresol, xylenol and hydroquinone may be mentioned.

These organic hydroxide compounds may be used alone or in combination as a mixture of two or more different kinds. A single use is of course acceptable. However, by using two or more different types in combination, it is sometimes possible to produce special effects to e.g. the powder properties of the polymer.

Further, when the solid catalyst component (A) of the present invention is obtained by using metallic magnesium, it is preferred to add one or more substances which are capable of reacting with metallic magnesium or of forming an addition compound, for example, polar substances, such as iodine, mercury chloride, an alkyl halide, an organic acid ester and an organic acid, for the purpose of facilitating the reaction.

Next, compounds belonging to the oxygen-containing organic magnesium compound include, for example, magnesium alkoxides such as methylate, ethylate, isopropylate, decanolate, methoxyethylate and cyclohexanolate, magnesium alkyl alkoxides such as ethylethylate, magnesium hydroalkoxides such as hydroxymethylate, magnesium phenoxides, such as phenate, naphthenate, phenanthlenate and cresolate, magnesium carboxylates such as acetate, stearate, benzoate, phenyl acetate, adipate, sebacate, phthalate, acrylate and oleate, oximates such as butyl oximate, dimethyl glyoximate and cyclohexyl oximate, salts of hydroxamic acid, hydroxylamine salts such as N-nitro-SO-N-phenylhydroxylamine derivatives, enolates such as acetylacetonate, magnesium silanolates such as triphenyl silanolate, and complex alkoxides of magnesium with other metals, such as $Mg[Al(OC_2H_5)_4]_2$. These oxygen-containing organic magnesium compounds may be used alone or in combination as a mixture of two or more different kinds.

As the oxygen-containing organic titanium compound as the reactant (ii), a compound of the formula $[TiO_a(OR^1)_b]_m$ may be used. In this formula, $R^1$ is a hydrocarbon group such as a Straight chain or branched chain alkyl, cycloalkyl, arylalkyl, aryl or alkylaryl group having from 1 to 20 carbon atoms, preferably from 1 to 10 carbon atoms, and a and b are numbers satisfying $a \geq 0$ and $b > 0$ and corresponding to the valence of titanium, and m is an integer. It is particularly preferred to employ an oxygen containing organic compound wherein a is $0 \leq a \leq 1$, and m is $1 \leq m \leq 6$.

Specific examples include titanium tetraethoxide, titanium tetra-n-propoxide, titanium tetra-i-propoxide, titanium tetra-n-butoxide and hexa-i-propoxydititanate. In the present invention, it is also possible to use a plurality of oxygen-containing organic compounds having different hydrocarbon groups. These oxygen-containing organic titanium compounds may be used alone or in combination as a mixture of two or more different kinds.

As the organic aluminum compound as the reactant (iii), a compound of the formula $R^2_nAlY_{3-n}$ may be used. In this formula, $R^2$ is the same or different alkyl groups having from 1 to 20 carbon atoms, preferably from 1 to 8 carbon atoms, Y is an alkoxy, aryloxy or cycloalkoxy group having from 1 to 20 carbon atoms, preferably from 1 to 8 carbon atoms, or a halogen atom, and n is a number satisfying $1 \leq n \leq 3$.

The above organic aluminum compounds may be used alone or in combination as a mixture of two or more different kinds.

Specific examples of such an organic aluminum compound include triethylaluminum, tri-i-butylaluminum, diethylaluminum chloride, ethylaluminum sesquichloride, i-butylaluminum dichloride and diethylaluminum ethoxide.

As the boron compound as the reactant (iv), a compound of the formula $B(OR^3)_cR^4_dR^5_e$ may be used. In this formula, a plurality of $R^3$ are the same or different alkyl or aryl groups having from 1 to 20 carbon atoms, preferably from 1 to 8 carbon atoms, and each of $R^4$ and $R^5$ is an alkyl or aryl group having from 1 to 20 carbon atoms, preferably from 1 to 8 carbon atoms, or a halogen atom such as fluorine, chlorine or bromine. $R^4$ and $R^5$ may be the same or different. Symbols c, d and e are numbers satisfying $0 < c \leq 3$, $0 \leq d$ and $e < 3$, respectively, provided $c+b+e=3$. Such a compound includes, for example, trimethoxyborane, triethoxyborane, triphenoxyborane, tributoxyborane, phenylboron diethoxide, methylboron dimethoxide, dimethylboron methoxide, dibutylboron butoxide, ethoxyboron dichloride, diethoxyboron chloride and diphenoxyboron chloride. Further, a mixture of such a compound with a compound of the formula $BZ_3$ wherein Z is a halogen atom such as fluorine, chlorine or bromine, may be used in a mixing molar ratio within a range of $0 \leq BZ_3/B(OR^3)_cR^4_dR^5_e < 1$.

As the aluminum halide compound as the reactant (v), a compound of the formula $R^6_zAlX_{3-z}$ may be used. In this formula, $R^6$ is a hydrocarbon group having from 1 to 20 carbon atoms, preferably from 1 to 8 carbon atoms, X is a halogen atom, z is a number satisfying $0 \leq z < 3$, preferably a number satisfying $0 \leq =z \leq 2$. $R^6$ is preferably selected from the group consisting of a straight chain or branched alkyl group, a cycloalkyl group, an arylalkyl group, an aryl group and an alkylaryl group.

The above aluminum halide compounds may be used alone or in combination as a mixture of two or more different kinds.

Specific examples of the aluminum halide compound include, for example, aluminum trichloride, diethylaluminum chloride, ethylaluminum dichloride, i-butylaluminum dichloride, or a mixture of triethylaluminum and aluminum trichloride.

The solid catalyst component (A) to be used in the present invention, can be prepared by reacting the reactants (iii) and (iv) to the reaction product obtained by reacting the above reactants (i) and (ii), and then reacting it with the reactant (v).

These reactions are preferably conducted in a liquid medium. Therefore, especially when these reactants are not liquid themselves under the operational conditions or when the amount of liquid reactants is inadequate, the reactions should better be conducted in the presence of an inert organic solvent. As such an inert organic solvent, any solvent which is commonly used in this technical field can be used. For example, an aliphatic, alicyclic or aromatic hydrocarbon, or halogen derivatives thereof or a mixture thereof may be used. For example, isobutane, hexane, heptane, cyclohexane, benzene, toluene, xylene and monochlorobenzene may preferably be employed.

There is no particular restriction as to the amount of the reactants to be used in the present invention. However, the atomic ratio of the gram atom of Mg in the magnesium compound of the reactant (i) to the gram atom of Ti in the titanium compound of the reactant (ii), is usually within a range of $1/20 \leq =Mg/Ti \leq 100$, preferably $1/5 \leq Mg/Ti \leq 50$. If the atomic ratio of Mg/Ti is higher than this range, it becomes difficult to obtain a uniform Mg-Ti solution for the preparation of the catalyst, or the catalytic activities for the polymerization tend to be poor. On the other hand, if the atomic ratio is too small, the activities of the catalyst tend to be poor, and there will be a problem that the product tends to undergo coloring.

The organic aluminum compound as the reactant (iii) is preferably used in such an amount that the atomic ratio of the n times of the gram atom of Al in the organic aluminum compound of the formula $R^2_n AlY_{3-n}$ wherein n is $1 \leq n \leq =3$ (hereinafter referred to as Al-(iii)) to the gram atom Ti in the titanium compound of the reactant (ii), is within a range of $1/100 \leq n \times Al(iii)/Ti \leq =200$, preferably $1/10 \leq n \times Al(iii)/Ti \leq =50$. If the atomic ratio of $n \times Al(iii)/Ti$ is higher than this range, the catalytic activities tend to be poor. On the other hand, if the ratio is too small, no adequate improvement of the powder properties will be obtained.

The boron compound as the reactant (iv) is used so that the atomic ratio thereof to the gram atom of Mg in the magnesium compound of the reactant (i) is within a range of $0.01 \leq B/Mg \leq 10.0$, preferably $0.1 \leq B/Mg \leq 3.0$. If the atomic ratio of B/Mg is smaller than this range, the particle size of the powder can not adequately be increased. On the other hand, if the atomic ratio is too high, coarse particles are likely to result, or the catalytic activities tend to be poor.

The aluminum halide compound as the reactant (v) is used in such an amount that the atomic ratio of the gram atom of Al in the organic aluminum compound of the reactant (iii) (Al(iii)) to the gram atom of Al in the aluminum halide compound (v) (hereinafter referred to as Al(v))) is within a range of $1/20 \leq Al(iii)/Al(v) \leq 10$, and $\frac{1}{8} \leq p$ where $p=X/(4 \times Ti+2 \times Mg)$ wherein Ti and X are gram atoms of titanium and halogen, respectively, and Mg is the gram atom of Mg in the metallic magnesium. Preferably, the amount is selected within a range of $1/10 \leq Al(iii)/Al(v) \leq 5$ and $4/5 \leq =p$. If the atomic ratio of Al(iii)/Al(v) is outside the above range, no adequate improvement in the powder properties will be obtained, and if p is too small, the catalytic activities will be poor.

It is preferred to select the amounts so that the atomic ratio of the gram atom of Mg in the magnesium compound of the reactant (i) (Mg(i)) to the gram atom of Al in the aluminum halide compound (v) will be within a range of $1/10 \leq Al(v)/Mg(i) \leq 50$, preferably $1 \leq Al(v)/Mg(i) \leq 20$. If the atomic ratio of Al(v)/Mg(i) is smaller than this range, no adequate improvement in the powder properties will be obtained, and if the atomic ratio is too large, the catalytic activities will be poor.

The reaction conditions for the respective stages are not particularly critical. The reactions are usually conducted with a temperature range of from $-50°$ to $300°$ C., preferably from $0°$ to $200°$ C. for from 0.5 to 50 hours, preferably from 1 to 6 hours in an inert gas atmosphere under atmospheric pressure or elevated pressure.

The solid catalyst component (A) thus obtained, may be used as it is, but is usually subjected to filtration or decantation to remove unreacted materials and by-products, washed several times with an inert organic solvent and then suspended in an inert organic solvent for use. It is also possible to use the one which is isolated after washing, followed by heating under atmospheric pressure or under reduced pressure to remove the inert organic solvent.

In the present invention, as the organic metal compounds of metals of Groups Ia, IIa, IIb, IIIb and IVb of the Periodic Table as the catalyst component (B), organic metal compounds comprising a metal such as lithium, magnesium, zinc, tin or aluminum, and an organic group, may be employed.

As such an organic group, an alkyl group may be mentioned as a representative. Such an alkyl group may be a straight chain or branched chain alkyl group having from 1 to 20 carbon atoms. Specifically, n-butyl lithium, diethylmagnesium, diethylzinc, trimethylaluminum, triethylaluminum, tri-i-butylaluminum, tri-n-butylaluminum, tri-n-decylaluminum, tetraethyltin or tetrabutyltin may, for example, be mentioned. It is particularly preferred to employ a trialkylaluminum having straight chain or branched chain alkyl groups having from 1 to 10 carbon atoms.

As component (B), it is also possible to employ an alkyl metal hydride having an alkyl group with from 1 to 20 carbon atoms. As such a compound, diisobutyl aluminum hydride or trimethyltin hydride may specifically be mentioned. Further, it is also possible to employ an alkyl metal halide having an alkyl group with from 1 to 20 carbon atoms, such as ethylaluminum sesquichloride, diethylaluminum chloride or diisobutylaluminum chloride, or an alkyl metal alkoxide such as diethylaluminum ethoxide. Further, it is also possible to employ an organic aluminum compound obtained by reacting a trialkylaluminum or a dialkylaluminum hydride having an alkyl group having from 1 to 20 carbon atoms with a diolefin having from 4 to 20 carbon atoms, such as isoprenyl aluminum.

The polymerization of an olefin in the present invention can be conducted under usual reaction conditions for so-called Ziegler method. Namely, the polymerization is conducted in a continuous system or in a batch system at a temperature of from $20°$ to $110°$ C. There is no particular restriction as to the pressure for polymerization. However, it is usually suitable to conduct the reaction under pressure, particularly under a pressure of from 1.5 to 50 kg/cm$^2$ G. When the polymerization is conducted in the presence of an inert solvent, any commonly employed solvent may be used as the inert solvent. Particularly preferred is an alkane or cycloalkane having from 1 to 20 carbon atoms, such as isobutane, pentane, hexane or cyclohexane.

For the operation of the present invention, the catalyst component (A) is used preferably in an amount corresponding to 0.001 to 2.5 mmol of titanium atom per 1 l of the solvent or per 1 l of the reactor. Depending upon the conditions, it may be used in a higher concentration.

The organic metal compound of component (B) is used usually at a concentration of from 0.02 to 50 mmol, preferably from 0.2 to 5 mmol, per l of the solvent or per l of the reactor.

In the process for preparing the polyolefin according to the present invention, the olefin to be polymerized may be an α-olefin of the formula R—CH=CH$_2$ wherein R is hydrogen or a straight chain or branched chain substituted or unsubstituted alkyl group having from 1 to 10 carbon atoms. Specifically, ethylene, propylene, 1-butene, 1-pentene, 4-methyl 1-pentene and 1-octene may be mentioned. Further, the copolymerization may be conducted by using a mixture of two or more such α-olefins or a mixture of such an α-olefin with a diene such as butadiene or isoprene. It is particularly preferred to use ethylene, a mixture of ethylene with an α-olefin other than ethylene, or a mixture of ethylene with a diene.

In the present invention, the molecular weight of the resulting polymer can be adjusted by a conventional method, for example, by a method wherein a proper amount of hydrogen is introduced in the reaction system.

With respect to the effects of the present invention, firstly, the powder properties of the polymer are remarkable. Namely, according to the present invention, the particle size distribution is extremely narrow, and the content of fine particles is small. Further, it is possible to obtain a polymer having high bulk density and a large average particle size. These properties are very significant from the industrial point of view. Namely, in the polymerization step, formation of substances deposited in the polymerization reactor can be avoided, and in the steps for separating and drying the polymer, the separation and filtration of the polymer slurry are facilitated, and scattering of the fine particles of the polymer out of the system can be prevented. Further, the drying efficiency will be improved by the improvement of flowability. In the transportation step, no bridge will be formed in the silo and troubles involved in the transportation can be eliminated. Further, it becomes possible to supply a polymer having a consistent quality.

The second effect of the present invention is that it is possible to obtain a polymer having a large average particle size even when the molecular weight distribution is made wide.

The third effect of the present invention is that the catalitic activities are high. Namely, the amount by weight of the polymer obtained per the unit weight of the solid catalyst component (A) is remarkably large. Accordingly, it is unnecessary to remove the remaining catalyst from the polymer by using a special means, and it is possible to avoid a problem such as a deterioration or coloring at the time of molding the polymer.

Now, the present invention will be described in further detail with reference to Examples. However, it should be understood that the present invention is by no means restricted by such specific Examples.

In the Examples and Comparative Examples, HLMI/MI is a ratio of a high load melt index (HLMI, according to condition F of ASTM D 1238) to the melt index (MI, according to condition E of ASTM D-1238), which is an index for the molecular weight distribution. The smaller the value of HLMI/MI, the narrower the molecular weight distribution.

The activities are represented by the amount (g) of the polymer produced per g of the solid catalyst component (A). For the determination of the breadth of the particle size distribution of the polymer particles, polymer particles were classified by sieves, the results were plotted on a logarithmic probability paper, a geometric standard deviation was obtained from an approximate linear line by a conventional method, and the breadth of the particle size distribution was represented by its common logarithms (hereinafter referred to as σ). Further, the average particle size is a value of the particle size corresponding to 50% of the weight integration of the above approximate linear line.

EXAMPLE 1

(a) Preparation of solid catalyst component (A)

Into a 1.6 l autoclave equipped with a stirrer; 70 g (0.94 mol) of n-butanol was charged, and then 0.55 g of idodine, 11 g (0.45 mol) of metallic magnesium powder and 15.5 g (0.045 mol) of titanium tetrabutoxide were added thereto. Further, 450 ml of hexane was added, and the mixture was heated to 80° C. and stirred for 1 hour under nitrogen sealing while removing hydrogen gas generated. Then, the mixture was heated to 120° C. and reacted for 1 hour to obtain a Mg-Ti solution. Into a flask having an inner capacity of 500 ml, the Mg-Ti solution was introduced in an amount corresponding to 0.048 mol of Mg and heated to 45° C., and then a hexane solution containing 30% by weight of diethylaluminum chloride (0.048 mol) was added thereto over a period of 1 hour. After completion of the addition, the mixture was stirred at 60° C. for 1 hour. Then, triethoxyborane, (0.012 mol) was added thereto, and the mixture was reacted for 1 hour under reflux. After cooling the mixture to 45° C., 107 ml of a hexane solution containing 50% by weight of i-butylaluminumdichloride was added thereto over a period of 2 hours. After completion of the addition, the mixture was stirred at 70° C. for 1 hour. Hexane was added to the product, and the product was washed 15 times by dacantation to obtain a slurry of a solid catalyst component (A) suspended in hexane (containing 9.5 g of the solid catalyst component (A)). A portion thereof was collected and the supernatant was removed, and the rest was dried under a nitrogen atmosphere and subjected to elemental analysis, whereby Ti was found to be 3.9% by weight. (b) Polymerization of ethylene A stainless steel autoclave having an internal capacity of 2 l and equipped with a magnetic stirrer, was thoroughly flushed with nitrogen, and 1.2 l of hexane was charged. The inner temperature was adjusted to 80° C. Then, 0.23 g (1.2 mmol) of tri-i-butylaluminum as the catalyst component (B) and the slurry containing 10 mg of the solid catalyst component (A) obtained in the above step (a) were sequentially added. The inner pressure of the autoclave was adjusted to 1 kg/cm$^2$ G, and then hydrogen was added under a pressure of 4 kg/cm$^2$ G. Then, while continuously adding ethylene so that the inner pressure of the autoclave was at a level of 11.0 kg/cm$^2$ G, polymerization was conducted for 1.5 hours. After completion of the polymerization, the product was cooled, and unreacted gas was discharged. Then, polyethylene was taken out and separated from the solvent by filtration and dried to obtain 258 g of polyethylene having a melt index of 0.35 g/10 min, a HLMI/MI of 58, a bulk density of 0.35 g/cm$^3$. The production amount per g of the solid catalyst component (A) (hereinafter referred to as an activity) was 25,800 g/g. The average particle size was 580 μm, and the proportion of fine particles having a particle sizes of not larger than 105 μm (hereinafter referred to as a fine particle content) was 4.1% by weight, and σ was 0.30.

EXAMPLES 2 AND 3

The reaction was conducted in the same manner as in step (a) in Example 1 except that in step (a) in Example 1, the amounts of the Mg-Ti solution and triethoxyborane were changed as shown in Table 1, to obtain a solid catalyst component (A).

Ethylene was polymerized under the same condition as in step (b) in Example 1 by using the solid catalyst component (A) thus obtained and tri-i-butylaluminum. The results are shown in Table 1.

EXAMPLES 4 AND 5

By using tributoxyborane instead of triethoxyborane, a solid catalyst component (A) was prepared in the same manner as in step (a) in Example 1. The amounts of the reactants used and the results of polymerization are shown in Table 1.

Ethylene was polymerized under the same condition as in step (b) in Example 1 by using the solid catalyst component (A) thus obtained and tri-i-butylaluminum.

EXAMPLE 6

(a) Preparation of a solid catalyst component (A)

Into a 1.6 l autoclave equipped with a stirrer, 35 g (0.47 mol) of n-butanol and 61.6 g (0.47 mol) of 2-ethylhexyl alcohol were charge-d, and 0.51 g of iodine, 10 g (0.412 mol) of metallic magnesium powder and 7 g (0.021 mol) of titanium tetrabutoxide were added thereto. Further, 450 ml of hexane was added thereto, and the mixture was heated to 80° C. While discharging hydrogen gas generated, the mixture was stirred for 1 hour under nitrogen sealing. Then, the mixture was heated to 120° C. and reacted for 1 hour to obtain a Mg-Ti solution. Into a flask having an internal capacity of 500 ml, the Mg-Ti solution was added in an amount corresponding to 0.078 mol of Mg and heated to 45° C. Then, a hexane solution of diethylaluminum chloride (0.078 mol) was added thereto over a period of 30 minutes. Then, a hexane solution containing 20% by weight of tri-i-butylaluminum (0.019 mol) was added thereto over a period of 30 minutes after completion of the addition, the mixture was stirred at 60° C. for 1 hour. After cooling the mixture to 45° C., 120 ml of a hexane solution containing 50% by weight of i-butylaluminum dichloride was added thereto over a period of 2 hours. After completion of the addition, the mixture was stirred at 70° C. for 1 hour.

The product was washed in the same manner as in Example 1 to obtain a solid catalyst component (A).

Ethylene was polymerized under the same condition as in step (b) in Example 1 by using the solid catalyst component (A) thus obtained and tri-i-butylaluminum. The results are shown in Table 1.

COMPARATIVE EXAMPLE 1

The reaction was conducted in the same manner as in Example 1 except that in Example 1, the reaction of triethoxyborane was omitted, and the amounts of the reactants were changed as shown in Table 1, to obtain a solid catalyst component.

Ethylene was polymerized under the same condition as in step (b) in Example 1 by using the solid catalyst component thus obtained and tri-i-butylaluminum. The results are shown in Table 1.

EXAMPLES 7 AND 8

A solid catalyst component (A) was prepared in the same manner as in Example 1 (a) except that in Example 7, a mixture of triethoxyborane and trichloroborane ($B(OEt)_3/BCl_3 = 2/1$ mol/mol) was used instead of triethoxyborane, and in Example 8, a mixture of tributoxiborane and trichloroborane ($B(OBu)_3/BCl_3 = 2/1$ mol/mol) was used instead of triethoxyborane. The amount of the reactants and the polymerization results are shown in Table 1.

Ethylene was polymerized under the same condition as in step (b) in Example 1 by using the solid catalyst component (A) thus obtained and tri-i-butylaluminum. The results are shown in Table 1.

TABLE 1

| | Preparation of solid catalyst component (A) | | | |
|---|---|---|---|---|
| | Amount of Mg in the Mg—Ti Solution (mol) | Organic aluminum compound (mol) | Boron compound (mol) | Aluminum halide compound (mol) |
| Example 1 | 0.048 | Diethylaluminum chloride (0.048) | Triethoxyborane (0.012) | i-Butylaluminum dichloride (0.293) |
| Example 2 | 0.049 | Diethylaluminum chloride (0.049) | Triethoxyborane (0.024) | i-Butylaluminum dichloride (0.292) |
| Example 3 | 0.080 | Diethylaluminum chloride (0.080) | Triethoxyborane (0.080) | i-Butylaluminum dichloride (0.478) |
| Example 4 | 0.072 | Diethylaluminum chloride (0.072) | Triethoxyborane (0.036) | i-Butylaluminum dichloride (0.434) |
| Example 5 | 0.069 | Diethylaluminum chloride (0.103) | Triethoxyborane (0.034) | i-Butylaluminum dichloride (0.413) |
| Example 6 | 0.078 | Diethylaluminum chloride (0.078) Triisobutylaluminum (0.019) | Triethoxyborane (0.039) | i-Butylaluminum dichloride (0.389) |
| Example 7 | 0.066 | Diethylaluminum chloride (0.066) | Triethoxyborane (0.033) Trichloroborane (0.017) | i-Butylaluminum dichloride (0.396) |
| Example 8 | 0.074 | Diethylaluminum chloride (0.074) | Tributoxyborane (0.037) Trichloroborane (0.018) | i-Butylaluminum dichloride (0.444) |
| Comparative Example 1 | 0.039 | Diethylaluminum chloride (0.039) | | i-Butylaluminum dichloride (0.233) |

| Results of ethylene polymerization | | | | | | |
|---|---|---|---|---|---|---|
| Activity (g/g) | MI (g/10 min.) | HLMI/MI | Bulk density (g/10 cc) | Fine particle content (%) | σ | Average particle size (μm) |

TABLE 1-continued

| | | | | | | | |
|---|---|---|---|---|---|---|---|
| Example 1 | 25800 | 0.35 | 58 | 0.35 | 4.1 | 0.30 | 580 |
| Example 2 | 30000 | 0.69 | 51 | 0.36 | 1.3 | 0.15 | 860 |
| Example 3 | 27900 | 0.52 | 55 | 0.36 | 0.7 | 0.13 | 1030 |
| Example 4 | 36000 | 0.59 | 54 | 0.33 | 1.8 | 0.31 | 1180 |
| Example 5 | 34800 | 0.65 | 56 | 0.31 | 4.5 | 0.28 | 770 |
| Example 6 | 27600 | 1.2 | 49 | 0.31 | 2.6 | 0.26 | 800 |
| Example 7 | 36500 | 0.49 | 47 | 0.37 | 3.2 | 0.32 | 1150 |
| Example 8 | 30000 | 0.10 | 62 | 0.33 | 6.0 | 0.36 | 920 |
| Comparative Example 1 | 20200 | 0.4 | 57 | 0.33 | 11.0 | 0.28 | 400 |

What is claimed is:

1. A process for producing a polyolefin, which comprises polymerizing at least one olefin in the presence of a catalyst system comprising:
   (A) a solid catalyst component (A) obtained by reacting to a uniform solution containing (i) at least one member selected from the group consisting of metallic magnesium and an organic alcohol, an organic silanol or a phenol, and an oxygen-containing organic magnesium compound, (ii) at least one oxygen-containing organic titanium compound,
   (iii) at least one organoaluminum compound,
   (iv) at least one boron compound having an alkoxy group,
   (v) at least one aluminum halide compound; and
   (B) at least one catalyst component (B) selected from the group consisting of organic metal compounds of metals of Groups Ia, IIa, IIb, IIIb and IVb of the Periodic Table with the provisos that the ratio of boron to magnesium is within the range of $0.1 \leq B/Mg \leq 3.0$; the organoaluminum compound as the reactant (iii) has the formula $R^2_n AlY_{3-n}$ wherein $R^2$ is an alkyl group having from 1 to 20 carbon atoms, Y is an alkoxy, aryloxy or cycloalkoxy group having from 1 to 20 carbon atoms or a halogen atom, and n is a number satisfying $1 \leq n \leq 3$; the atomic ratio of the gram atom of Mg in the compound of the reactant (i) to the gram atom of Ti in the titanium compound of the reactant (ii) is within a range of $1/5 \leq Mg/Ti \leq 50$; the atomic ratio of the gram atom of Al in the organic aluminum compound of the reactant (iii) to the gram atom of Ti in the titanium compound of the reactant (ii) is within a range of $1/10 \leq n \times Al(iii)/Ti \leq 50$, where n is as defined above and Al(iii) is the gram atom of Al in the organo aluminum compound of the reactant (iii); the aluminum halide compound of the reactant (v) is used in an amount to satisfy the atomic ratio of $1/10 \leq Al(iii)/Al(v) \leq 5$ where Al(iii) is as defined above and Al(v) is the gram atom of Al in the aluminum halide compound of the reactant (v) and $4/5 \leq p$ where $p = X/(4 \times Ti + 2 \times Mg)$ wherein X is the gram atom of halogen, Ti is the gram atom of titanium, and Mg is the gram atom of magnesium in the reactant (i); the aluminum halide compound is used in an amount to satisfy an atomic ratio of $1 \leq Al(v)/(Mg(i) \leq 20$ where Al(v) is the gram atom of Al in the aluminum halide compound of the reactant (v) and Mg(i) is the gram atom of Mg in the magnesium compound in the reactant (i).

2. The process according to claim 1, wherein the oxygen-containing organic magnesium compound is at least one member selected from the group consisting of magnesium alkoxides, magnesium alkylalkoxides, magnesium hydroalkoxides, magnesium phenoxides, magnesium carboxylates, oximates, hydroxamates, hydroxylamine salts, enolates, magnesium silanolates, and complex alkoxides of magnesium with other metals.

3. The process according to claim 1, wherein the oxygen-containing organic titanium compound as the reactant (ii) is a compound of the formula $[TiO_a(OR^1)_b]_m$ wherein $R^1$ is a hydrocarbon group having from 1 to 20 carbon atoms, a and b are numbers satisfying $a \geq = 0$ and $b > 0$ and corresponding to the valence of titanium, and m is an integer.

4. The process according to claim 3, wherein a is a number satisfying $0 \leq a \leq 1$, and m is a number satisfying $1 \leq : m \leq 6$.

5. The process according to claim 1, wherein the boron compound as the reactant (iv) has the formula $B(OR^3)_c R^4_d R^5$ wherein $R^3$ is an alkyl or aryl group having from 1 to 20 carbon atoms, and each of $R^4$ and $R^5$ is an alkyl or aryl group having from 1 to 20 carbon atoms or a halogen atom, c, d and e are numbers satisfying $0 < c \leq 3$, $0 \leq d$ and $e < 3$, respectively, provided $c + d + e = 3$.

6. The process according to claim 1, wherein the boron compound as the reactant (iv) has the formula $B(OR^3)_3$ wherein $R^3$ is an alkyl or aryl group having from 1 to 20 carbon atoms.

7. The process according to claim 1, wherein the aluminum halide compound has the formula $R^6_z AlX_{3-z}$ wherein $R^6$ is a hydrocarbon group having from 1 to 20 carbon atoms, X is a halogen atom, z is a number satisfying $0 \leq z < 3$.

* * * * *